US012559237B2

(12) United States Patent
Davis-Delano et al.

(10) Patent No.: US 12,559,237 B2
(45) Date of Patent: Feb. 24, 2026

(54) COMBINATION MONUMENT HAVING LAVATORY AND GALLEY FOR AN INTERNAL CABIN OF AN AIRCRAFT

(71) Applicant: THE BOEING COMPANY, Arlington, VA (US)

(72) Inventors: Sachel Davis-Delano, Shoreline, WA (US); Paul Addis, Bothell, WA (US); Rohan Srinivas Sharma, Mountlake Terrace, WA (US); Justin Tabora, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/415,785

(22) Filed: Jan. 18, 2024

(65) Prior Publication Data

US 2024/0391592 A1     Nov. 28, 2024

Related U.S. Application Data

(60) Provisional application No. 63/503,970, filed on May 24, 2023.

(51) Int. Cl.
*B64D 11/04* (2006.01)
*B64D 11/02* (2006.01)

(52) U.S. Cl.
CPC .............. *B64D 11/04* (2013.01); *B64D 11/02* (2013.01)

(58) Field of Classification Search
CPC ................................ B64D 11/02; B64D 11/04
See application file for complete search history.

(56) References Cited

U.S. PATENT DOCUMENTS

| | | | | |
|---|---|---|---|---|
| 5,560,050 A * | 10/1996 | Tagg | ..................... | A47K 11/02 |
| | | | | 4/449 |
| 9,708,062 B2 * | 7/2017 | Grant | ..................... | B64D 11/02 |
| 11,370,548 B2 * | 6/2022 | Hough | .................. | B64D 11/04 |
| 2008/0265092 A1 * | 10/2008 | Cooper | ................. | B64D 11/02 |
| | | | | 244/119 |
| 2012/0248245 A1 * | 10/2012 | Schliwa | .............. | B64D 11/003 |
| | | | | 244/118.5 |
| 2013/0206904 A1 * | 8/2013 | Gee | ........................ | B64D 11/04 |
| | | | | 244/118.5 |
| 2013/0206907 A1 * | 8/2013 | Burrows | ................ | B64D 11/02 |
| | | | | 244/118.5 |
| 2013/0259562 A1 * | 10/2013 | Burd | .................. | B64D 11/0696 |
| | | | | 403/187 |
| 2014/0048650 A1 * | 2/2014 | Schliwa | ............ | B64D 11/0691 |
| | | | | 244/118.5 |
| 2014/0097294 A1 * | 4/2014 | Boren | .................... | B64D 11/02 |
| | | | | 244/118.5 |
| 2014/0125092 A1 * | 5/2014 | Schreuder | .............. | B64D 11/00 |
| | | | | 29/401.1 |
| 2014/0224930 A1 * | 8/2014 | Ivester | .................. | B64D 11/04 |
| | | | | 244/118.5 |

(Continued)

FOREIGN PATENT DOCUMENTS

DE        102016013717 A1 *  5/2018  ............. B64D 11/02

*Primary Examiner* — Arfan Y. Sinaki
(74) *Attorney, Agent, or Firm* — Joseph M. Butscher; Carroll, Hoette & Butscher, LLC

(57) ABSTRACT

A combination monument for an internal cabin of an aircraft includes a housing defining an internal chamber. A lavatory is within the internal chamber. A galley is coupled to the housing.

20 Claims, 11 Drawing Sheets

(56) References Cited

U.S. PATENT DOCUMENTS

| | | | | |
|---|---|---|---|---|
| 2015/0069179 A1* | 3/2015 | Ehlers | .................... | B64D 11/04 |
| | | | | 244/118.5 |
| 2015/0266582 A1* | 9/2015 | Koyama | ................ | B64D 11/02 |
| | | | | 244/118.5 |
| 2015/0284097 A1* | 10/2015 | Schliwa | ................. | B64D 11/04 |
| | | | | 244/118.6 |
| 2016/0009395 A1* | 1/2016 | Savian | ................... | B64D 11/02 |
| | | | | 244/118.5 |
| 2016/0009396 A1* | 1/2016 | Seibt | ..................... | B64D 11/02 |
| | | | | 29/428 |
| 2016/0122020 A1* | 5/2016 | Najd | ...................... | B64D 11/02 |
| | | | | 29/823 |
| 2018/0208314 A1* | 7/2018 | Heidtmann | ........ | B64D 11/0698 |
| 2021/0107655 A1* | 4/2021 | Mair | ................. | B64D 11/0007 |
| 2021/0387728 A1* | 12/2021 | Young | ....................... | B64C 1/18 |
| 2023/0356843 A1* | 11/2023 | Brown | .................. | B64D 11/02 |

* cited by examiner

COMBINATION MONUMENT HAVING LAVATORY AND GALLEY FOR AN INTERNAL CABIN OF AN AIRCRAFT

CROSS-REFERENCE TO RELATED APPLICATIONS

This application is a non-provisional conversion of, and claims priority to, U.S. Provisional Patent Application No. 63/503,970, filed May 24, 2023, which is incorporated by reference in its entirety.

FIELD OF THE DISCLOSURE

Examples of the present disclosure generally relate to a combination monument for an internal cabin of an aircraft.

BACKGROUND OF THE DISCLOSURE

Vehicles such as commercial aircraft are used to transport passengers between various locations. A typical aircraft includes an internal cabin having seats for passengers.

As can be appreciated, the space within an internal cabin is limited. Airline operators seek to provide comfortable areas for passengers within the limited space of an internal cabin.

SUMMARY OF THE DISCLOSURE

Certain examples of the present disclosure provide a combination monument for an internal cabin of an aircraft. The combination monument includes a housing defining an internal chamber. A lavatory is within the internal chamber. A galley is coupled to the housing.

In at least one example, the galley is outside of the internal chamber. The galley includes a cart compartment configured to store one or more galley carts. The cart compartment can be sized and shaped to retain one full size galley cart, or two half sized galley carts. The galley can also include a countertop over the cart compartment.

The lavatory includes a toilet. In at least one example, the toilet is disposed at an angle in relation to a passage leading into the lavatory.

The combination monument can also include an attendant seat outside of the internal chamber. For example, the attendant seat is secured to a wall of the housing.

In at least one example, the combination monument can be secured between an aisle, a cross-aisle that extends into the aisle and leads to an entry door, an outboard wall, and a row of seats. The combination monument can be spaced apart from another monument by the aisle. The combination monument can be secured to an outboard wall of the internal cabin. The combination monument can be secured to seat tracks of the internal cabin.

Certain examples of the present disclosure provide an aircraft including an internal cabin, and a combination monument within the internal cabin, as described herein.

Certain examples of the present disclosure provide a method of providing a combination monument for an internal cabin of an aircraft, the method including providing a housing defining an internal chamber; disposing a lavatory within the internal chamber; and coupling a galley to the housing.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a combination monument for an internal cabin of an aircraft. In particular, the combination monument includes a lavatory and a galley. Instead of the lavatory and the galley being separated from one another, the lavatory and the galley are combined together in a common assembly.

The combination monument can be disposed at various areas within the internal cabin, such as proximate one or more doors. In at least one example, the combination monument also includes a cart compartment, which can be configured to store one full galley cart, or two half galley carts. In at least one example, the lavatory includes a toilet, which can be disposed at an angle to take advantage of lavatory space and provide an acceptable passenger experience. A space over the cart compartment can include a countertop area, one or more shelves, and or space for branding. An optional attendant seat can be inboard of a door to the lavatory. Besides the value of an extra bar/countertop area, the addition of the cart compartment to the lavatory monument can allow replacement of other cart areas in the internal cabin with passenger seats.

In at least one example, the combination monument is configured to be the same width (38 inches) as a standard Boeing 787 lavatory, and retain the same ceiling attachment fittings. The length of the combination monument can be increased to allow room for the extra cart, while retaining acceptable lavatory comfort.

Figure 1:
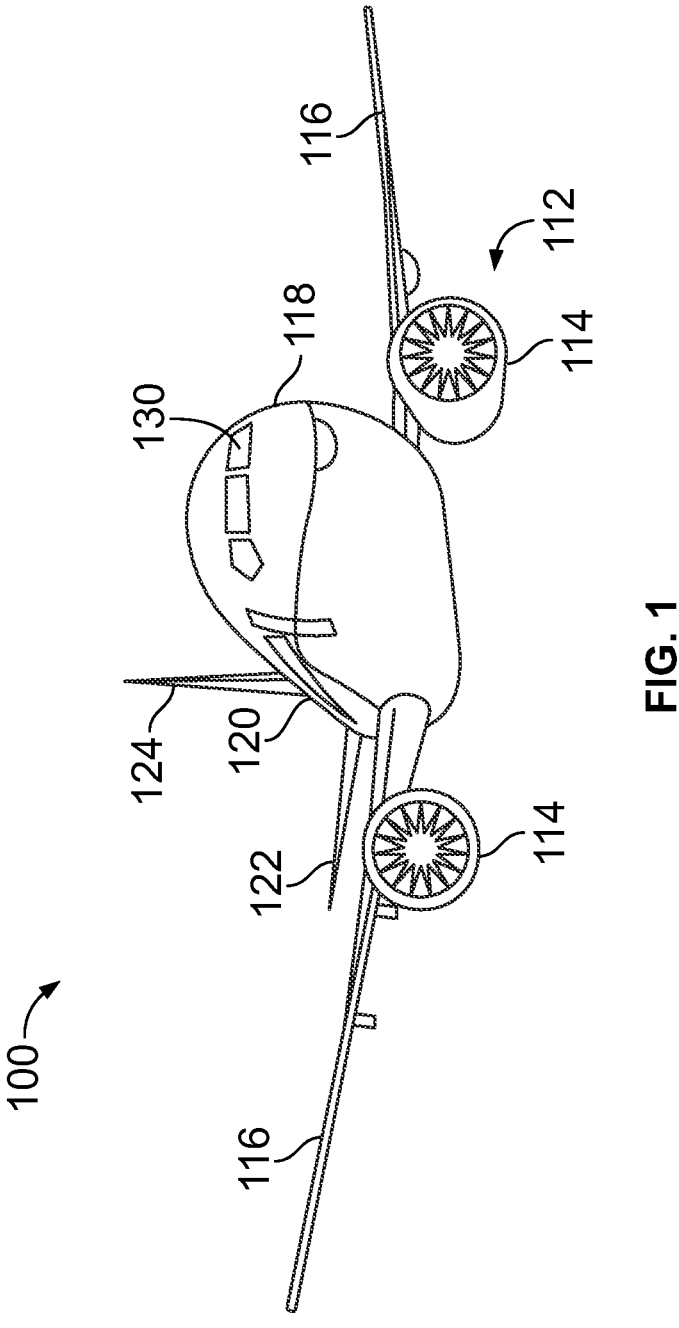
FIG. 1 illustrates a perspective front view of an aircraft, according to an example of the present disclosure.

In at least one example, the combination monument includes a housing having a lavatory within an internal chamber, and a galley. That is, the housing includes the lavatory and the galley. In at least one example, the galley is outside of the internal chamber. The galley can include a cart compartment configured to store one or more galley carts. The galley can also include a countertop over the cart compartment. In at least one example, the lavatory includes a toilet disposed at an angle in relation to a passage leading into the lavatory. The combination monument can also include an attendant seat outside of the internal chamber FIG. 1 illustrates a perspective front view of an aircraft 100, according to an example of the present disclosure. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124.

The fuselage 118 of the aircraft 100 defines an internal cabin 130, which includes a flight deck or cockpit, one or more work sections (for example, galleys, personnel carry-on baggage areas, and the like), one or more passenger sections (for example, first class, business class, and coach sections), one or more lavatories, and/or the like.

Alternatively, instead of an aircraft, examples of the present disclosure may be used with various other vehicles, such as automobiles, buses, locomotives and train cars, watercraft, and the like. Also, optionally, examples of the present disclosure can be used with fixed structures.

Figure 2:
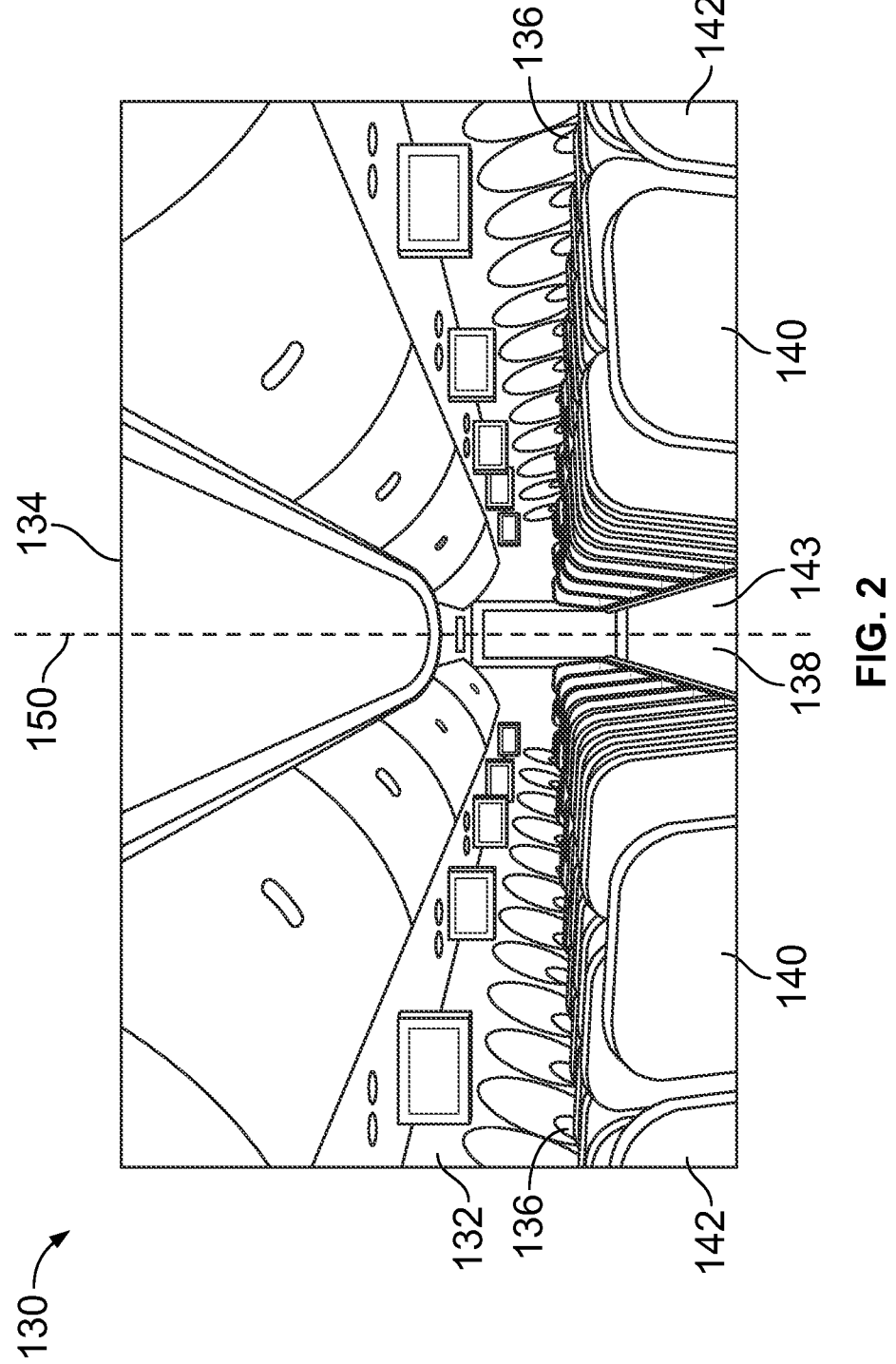
FIG. 2 illustrates a perspective interior view of an internal cabin of an aircraft, according to an example of the present disclosure.

FIG. 2 illustrates a perspective interior view of an internal cabin 130 of an aircraft, according to an example of the present disclosure. The internal cabin 130 includes outboard walls 132 and a ceiling 134. Windows 136 may be formed within the outboard walls 132. A floor 138 supports rows of seats 140. As shown in FIG. 2, a row 142 may include three seats 140 on either side of an aisle 143. However, the row 142 may include more or less seats 140 than shown. Additionally, the internal cabin 130 may include more aisles than shown.

As used herein, the term "outboard" means a position that is further away from a central longitudinal plane 150 of the internal cabin 130 as compared to another component. The term "inboard" means a position that is closer to the central longitudinal plane 150 of the internal cabin 130 as compared to another component.

One or more combination monuments as described herein can be disposed within the internal cabin 130, such as in front of or behind a row of seats 140.

Figure 3:
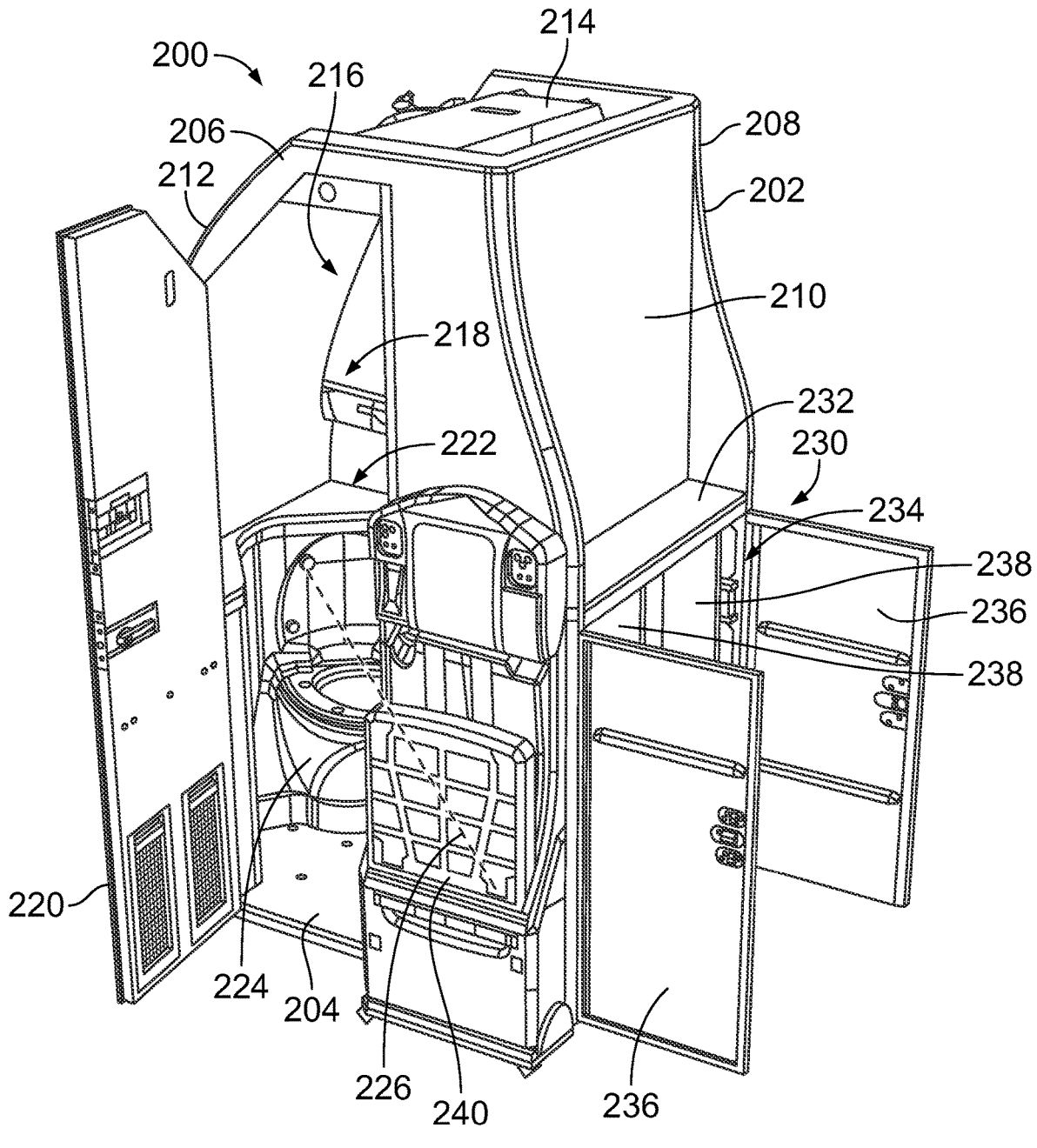
FIG. 3 illustrates an isometric view of a combination monument, according to an example of the present disclosure.
Figure 4:
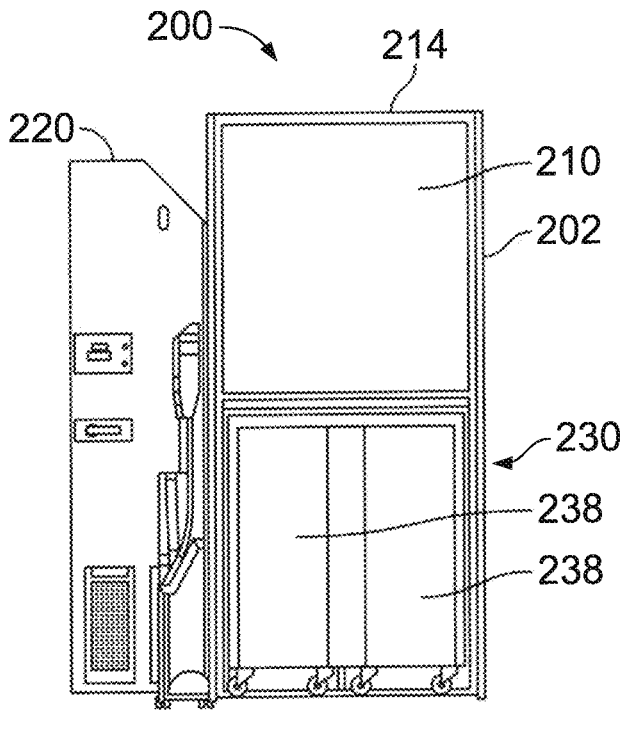
FIG. 4 illustrates a first side view of the combination monument of FIG. 3.
Figure 5:
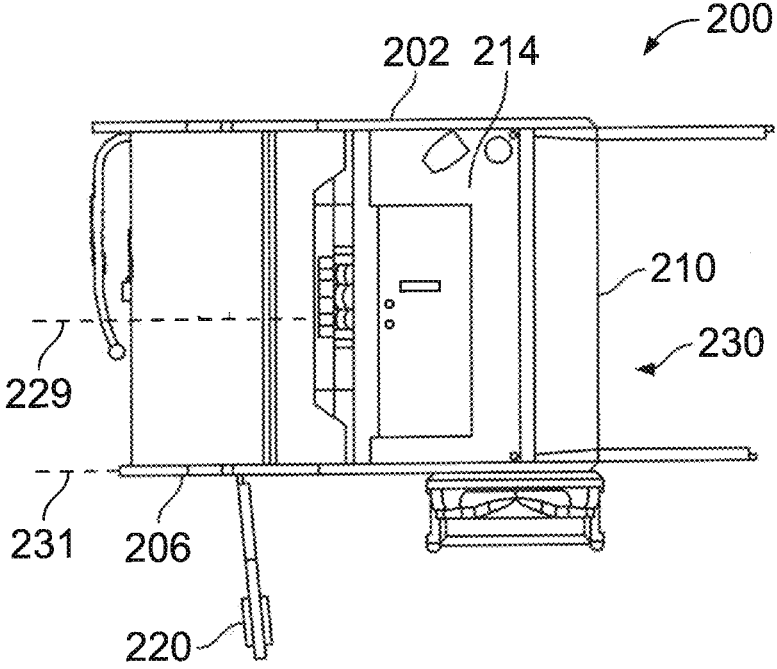
FIG. 5 illustrates a top view of the combination monument of FIG. 3.
Figure 6:
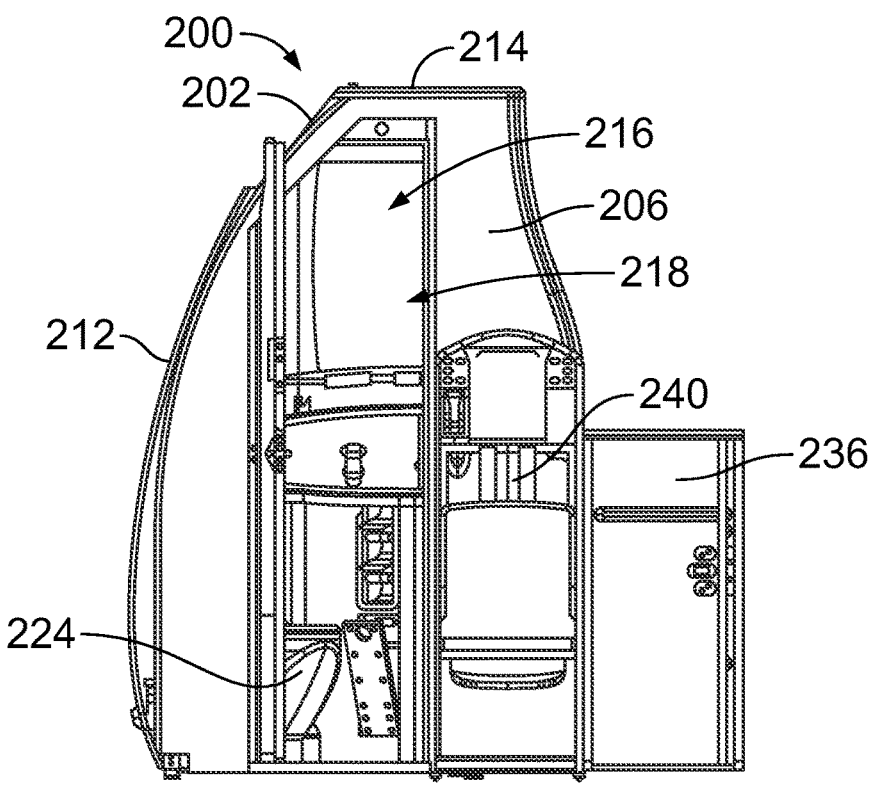
FIG. 6 illustrates a first end view of the combination monument of FIG. 3.
Figure 7:
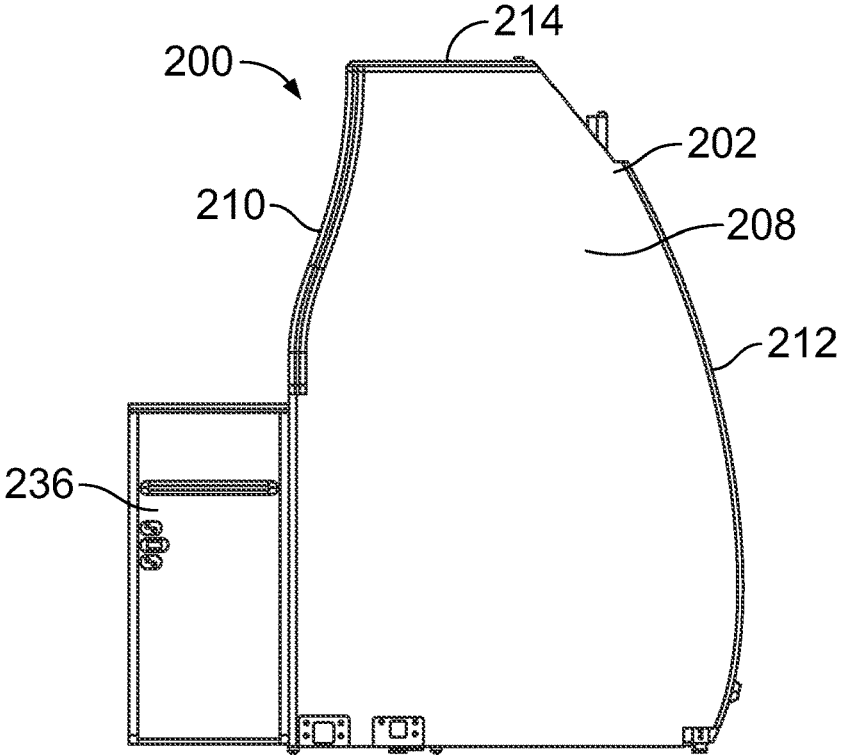
FIG. 7 illustrates a second end view of the combination monument of FIG. 3.

FIG. 3 illustrates an isometric view of a combination monument 200, according to an example of the present disclosure. FIG. 4 illustrates a first side view of the combination monument 200 of FIG. 3. FIG. 5 illustrates a top view of the combination monument 200 of FIG. 3. FIG. 6 illustrates a first end view of the combination monument 200 of FIG. 3. FIG. 7 illustrates a second end view of the combination monument 200 of FIG. 3.

Referring to FIGS. 3-7, the combination monument 200 includes a housing 202 including a base 204, such as a floor. Optionally, the housing 202 may not include the base 204, and the floor of an internal cabin can provide the base or floor for the housing 202.

A first end wall 206 extends upwardly from the base 204. A second end wall 208 opposite from the first end wall 206 extends upwardly from the base 204. A first side wall 210 extends upwardly from the base 204, and a second side wall 212 opposite from the first side wall 210 extends upwardly the base 204. The first end wall 206, the second end wall 208, the first side wall 210, and the second side wall 212 can also connect to a ceiling 214. The housing 202 may include the ceiling 214. Optionally, an internal cabin can provide the ceiling 214.

The first end wall 206 can be a fore end wall, which is oriented toward, and closer to, a fore end of an internal cabin than an aft end. Accordingly, the second end wall 208 can be an aft end wall, which is oriented toward, and closer to the aft end of an internal cabin than the fore end. Optionally, the first end wall 206 can be the aft end wall, and the second end wall 208 can be the fore end wall.

The first side wall 210 can be an inboard wall, which is oriented toward, and closer to, a central longitudinal plane of an internal cabin than the second side wall 212. The second side wall 212 can be contoured to conform to the shape and size of an outboard wall of an internal cabin.

The housing 202 defines an internal chamber 216. The internal chamber 216 is defined between the base 204, the first end wall 206, the second end wall 208, the first side wall 210, the second side wall 212, and the ceiling 214. A passage 218 is formed through the first end wall 206. The passage 218 leads into the internal chamber 216. A door 220 is moveably secured to first end wall 206 (such as to a door frame), and is configured to move between a closed position, in which the internal chamber 216 is closed, and an open position, in which the internal chamber 216 is opened.

The internal chamber 216 includes a lavatory 222. In at least one example, the internal chamber 216 is the lavatory 222. Optionally, the internal chamber 216 can include additional space other than the lavatory 222.

Figure 11:
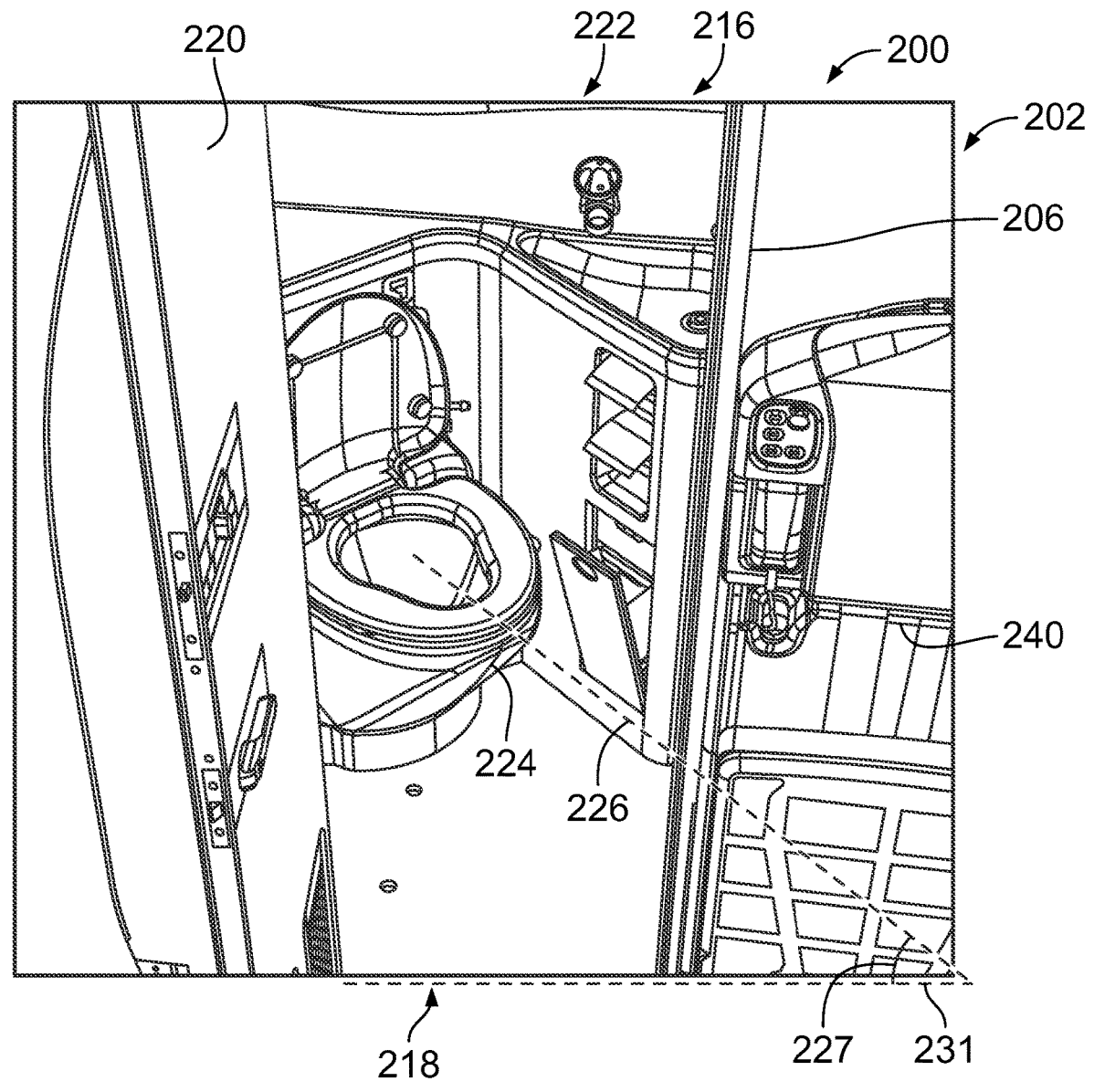
FIG. 11 illustrates an isometric side internal view of a lavatory of the combination monument, according to an example of the present disclosure.
Figure 12:
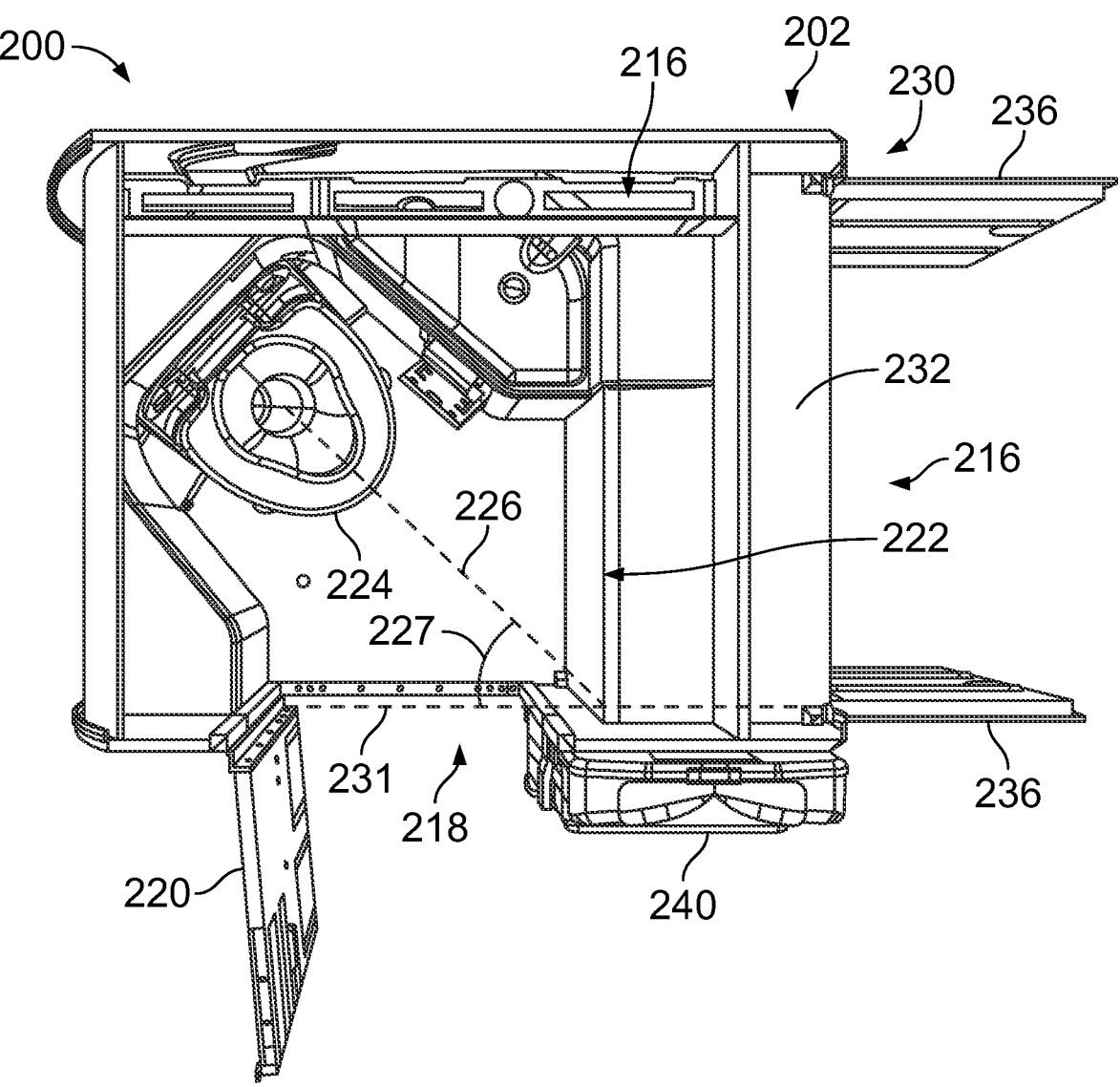
FIG. 12 illustrates an isometric top internal view of the lavatory of the combination monument of FIG. 11.

The lavatory 222 includes a toilet 224, which can be disposed at an angle in relation to the passage 218 into the lavatory 222. In particular, the toilet 224 includes a longitudinal plane 226 that is at an angle 227 (such as shown in FIGS. 11 and 12) in relation to a plane 229 that is parallel to a plane 231 of the passage 218. The longitudinal plane 226 can be at the angle 227 in relation to a central longitudinal plane of an internal cabin.

The combination monument 200 also includes a galley 230 on one or more exterior walls of the housing 202. For example, the galley 230 can be formed in, or otherwise extend from, the first side wall 210. In at least one example, the galley 230 includes a countertop or shelf 232 above a cart compartment 234. The cart compartment 234 can include doors 236, which can be opened to expose the cart compartment 234, and closed to close the cart compartment 234. Optionally, the cart compartment 234 may not include the doors 236. The cart compartment 234 is configured to removably retain one or more galley carts. In at least one example, the cart compartment 234 is sized and shaped to retain either one full size galley cart, or two half size galley carts. For example, the cart compartment 234 can retain a full size galley cart, or two half size galley carts 238.

In at least one example, an attendant seat 240 is mounted to an exterior of the first end wall 206, such as offset from a side of the passage 218. Optionally, the attendant seat 240 can be secured to other areas of the first end wall 206, or other walls of the monument 200. Alternatively, the combination monument 200 may not include the attendant seat 240.

As shown and described herein, the combination monument 200 integrates the lavatory 222, the galley 230, and the cart compartment 234 into a single unit (such as the assembly shown in FIGS. 3-7), thereby freeing up space within an internal cabin for additional seating.

As described herein, the combination monument 200 is for an internal cabin of a vehicle, such as a commercial aircraft. The combination monument 200 includes the housing 202 defining the internal chamber 216. The lavatory 222 is within the internal chamber 216. In at least one example, the internal chamber 216 is the lavatory 222. The galley 230 is coupled to the housing 202. For example, the galley 230 extends from and/or is formed in one or more walls of the housing 202.

Figures 8, 9:
FIG. 8 illustrates a side view of the combination monument within an internal cabin, according to an example of the present disclosure.
FIG. 9 illustrates an end view of the combination monument within the internal cabin of FIG. 8.

FIG. 8 illustrates a side view of the combination monument 200 within an internal cabin 300, according to an example of the present disclosure. FIG. 9 illustrates an end view of the combination monument 200 within the internal cabin 300 of FIG. 8. Referring to FIGS. 8 and 9, the combination monument 200 can be disposed at an underutilized location within the internal cabin 300, such as proximate to one or more entry doors 302 into the internal cabin 300. As shown, the combination monument 200 can be secured between an aisle 304, a cross-aisle 306 that extends into the aisle 304 and leads to the entry door 302, an outboard wall 307, and a row 309 of seats 308 (such as behind the row 309). The galley 230 can be used for self-service snacks, and drinks, for example.

Figure 10:
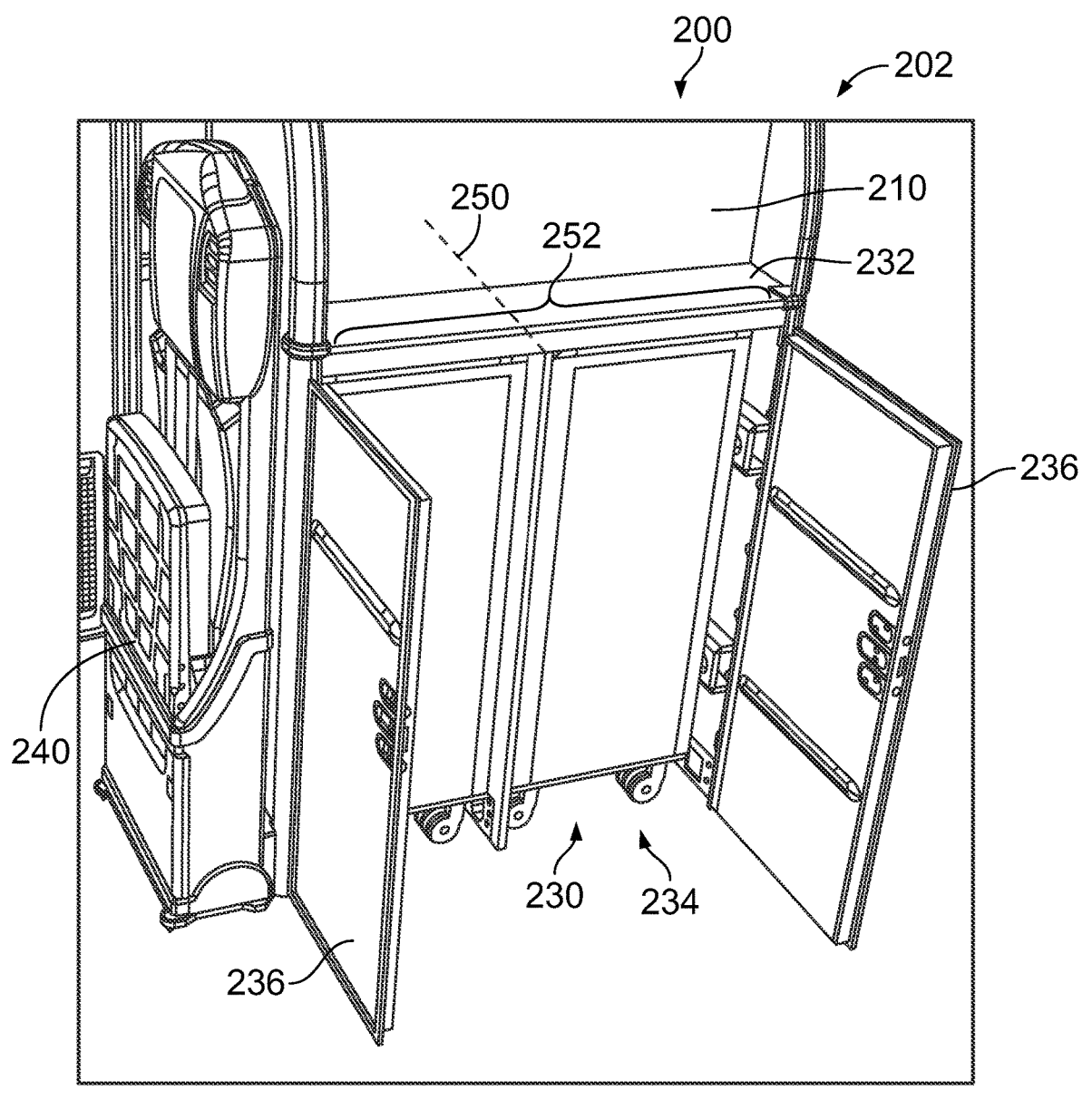
FIG. 10 illustrates an isometric front view of a galley of the combination monument, according to an example of the present disclosure.

FIG. 10 illustrates an isometric front view of the galley 230 of the combination monument 200, according to an example of the present disclosure. The doors 236 are shown in open positions, thereby exposing the cart compartment 234. As shown, two half size carts 238 can be retained within the cart compartment 234. The half size carts 238 can each be retained length-wise along a longitudinal plane 250 of the cart compartment 234. As another option, a full size cart can be retained along a width 252 of the cart compartment 234 (such as perpendicular to the longitudinal plane 250).

FIG. 11 illustrates an isometric internal view of a lavatory 222 of the combination monument 200, according to an example of the present disclosure. FIG. 12 illustrates an isometric top internal view of the lavatory 222 of the combination monument 200 of FIG. 11. Referring to FIGS. 11 and 12, the door 220 is shown in the open position to allow access into the lavatory 222. As noted, the toilet 224 is disposed at the angle 227 in relation to the passage 218 into the lavatory 222. In particular, the longitudinal plane 226 of the toilet 224 is at the angle 227 in relation to the plane 231 of the passage 218. In at least one example, the angle 227 is between 15-75 degrees. For example, the angle 227 can be 45 degrees. Alternatively, the toilet 224 may not be disposed at the angle 227. Instead, the longitudinal plane 226 can be parallel with, or optionally perpendicular to, the plane 231.

Figure 13:
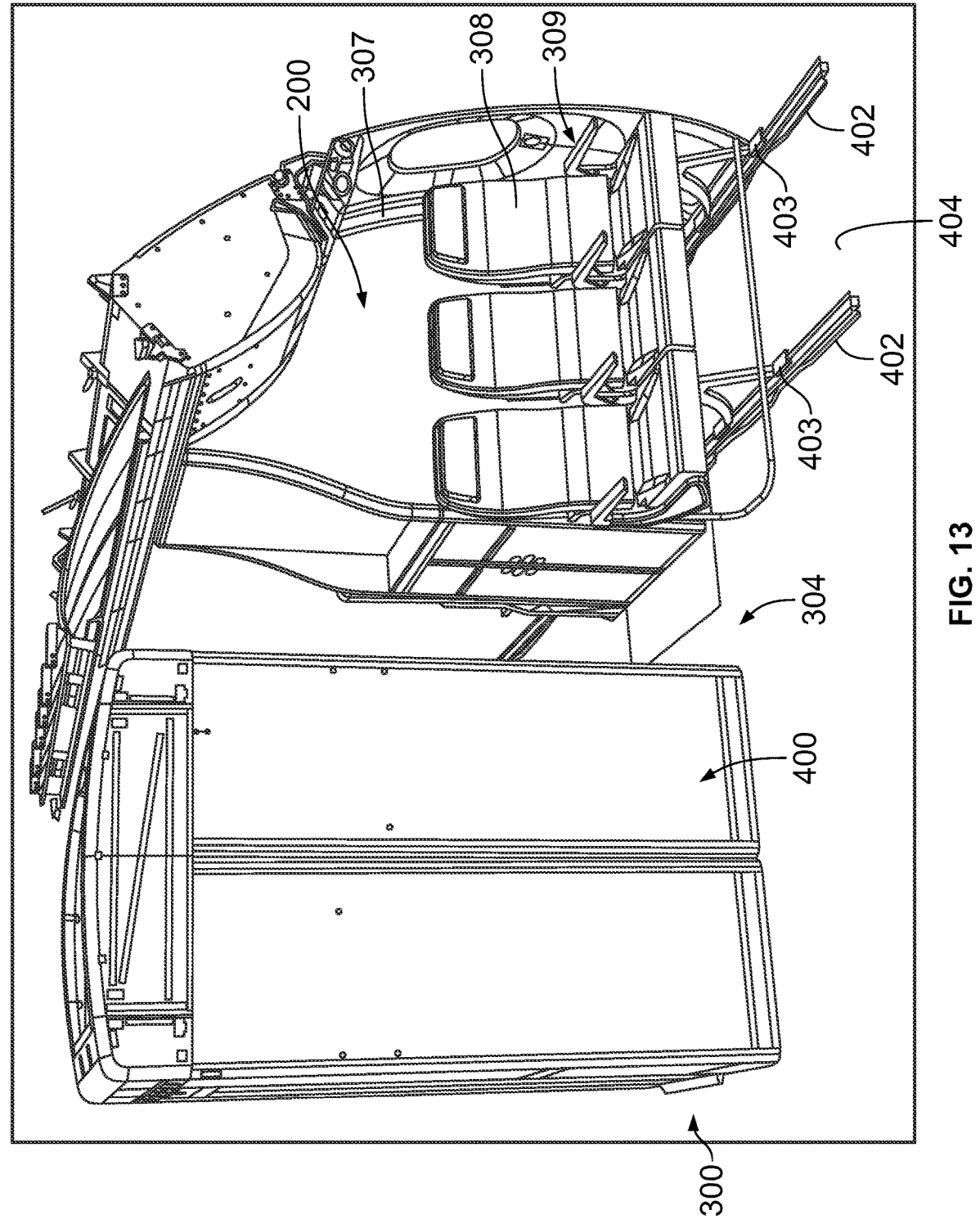
FIG. 13 illustrates an isometric forward internal view of a portion of an internal cabin, according to an example of the present disclosure.
Figure 14:
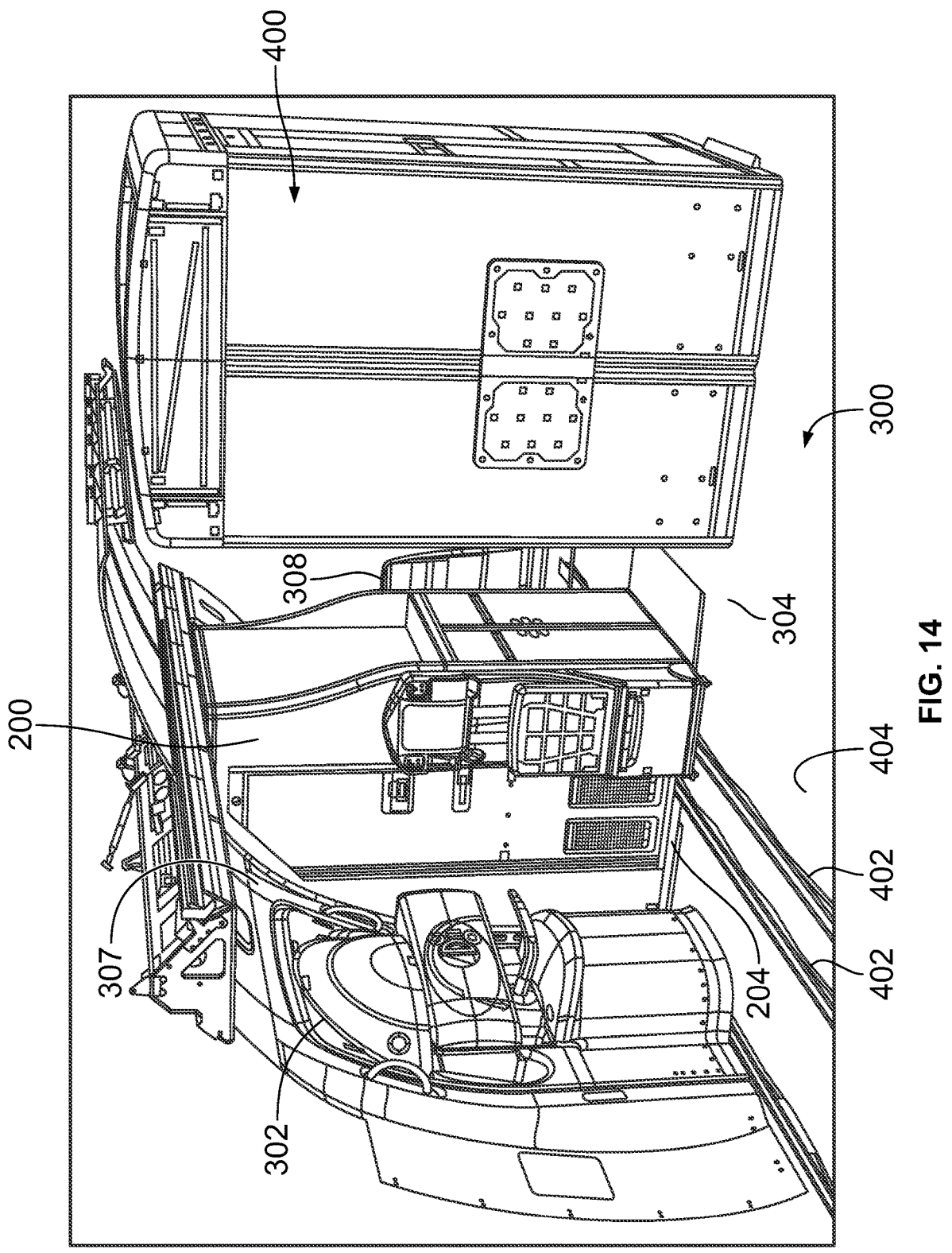
FIG. 14 illustrates an isometric aft internal view of the portion of the internal cabin of FIG. 13.

FIG. 13 illustrates an isometric forward internal view of a portion of an internal cabin 300, according to an example of the present disclosure. FIG. 14 illustrates an isometric aft internal view of the portion of the internal cabin 300 of FIG. 13. In at least one example, the combination monument 200 can be secured to the outboard wall 307 within the internal cabin 300, by an entry door 302, and spaced apart from another monument 400 (such as a persons of reduce mobility (PRM) lavatory) by the aisle 304.

The combination monument 200 can be secured to seat tracks 402 on a floor 404 of the internal cabin 300. The seat tracks 402 are used to secure seats within the internal cabin. In at least one example, the base 204 of the combination monument 200 includes fittings, such as fittings 403 of seats 308, that secure the combination monument 200 to the seat tracks 402.

Further, the disclosure comprises examples according to the following clauses:

Clause 1. A combination monument for an internal cabin of an aircraft, the combination monument comprising:
a housing defining an internal chamber;
a lavatory within the internal chamber; and
a galley coupled to the housing.

Clause 2. The combination monument of Clause 1, wherein the galley is outside of the internal chamber.

Clause 3. The combination monument of Clauses 1 or 2, wherein the galley comprises a cart compartment configured to store one or more galley carts.

Clause 4. The combination monument of Clause 3, wherein the cart compartment is sized and shaped to retain one full size galley cart, or two half sized galley carts.

Clause 5. The combination monument of Clauses 3 or 4, wherein the galley further comprises a countertop over the cart compartment.

Clause 6. The combination monument of any of Clauses 1-5, wherein the lavatory comprises a toilet.

Clause 7. The combination monument of Clause 6, wherein the toilet is disposed at an angle in relation to a passage leading into the lavatory.

Clause 8. The combination monument of any of Clauses 1-7, further comprising an attendant seat outside of the internal chamber.

Clause 9. The combination monument of Clause 8, wherein the attendant seat is secured to a wall of the housing.

Clause 10. The combination monument of any of Clauses 1-9, wherein the combination monument is configured to be secured between an aisle, a cross-aisle that extends into the aisle and leads to an entry door, an outboard wall, and a row of seats, wherein the combination monument is configured to be spaced apart from another monument by the aisle, wherein the combination monument is configured to be secured to an outboard wall of the internal cabin, and wherein the combination monument is configured to be secured to seat tracks of the internal cabin.

Clause 11. An aircraft comprising:
an internal cabin; and
a combination monument within the internal cabin, the combination monument comprising:
a housing defining an internal chamber;
a lavatory within the internal chamber; and
a galley coupled to the housing.

Clause 12. The aircraft of Clause 11, wherein the galley is outside of the internal chamber.

Clause 13. The aircraft monument of Clauses 11 or 12, wherein the galley comprises:
a cart compartment configured to store one or more galley carts; and
a countertop over the cart compartment.

Clause 14. The aircraft of any of Clauses 11-13, wherein the lavatory comprises a toilet disposed at an angle in relation to a passage leading into the lavatory.

Clause 15. The aircraft of any of Clauses 11-14, wherein the combination monument further comprise an attendant seat outside of the internal chamber, and wherein the attendant seat is secured to a wall of the housing.

Clause 16. The aircraft of any of Clauses 11-15, wherein the combination monument is secured between an aisle, a cross-aisle that extends into the aisle and leads to an entry door, an outboard wall, and a row of seats.

Clause 17. The aircraft of any of Clauses 11-16, wherein the combination monument is spaced apart from another monument by the aisle.

Clause 18. The aircraft of any of Clauses 11-17, wherein the combination monument is secured to an outboard wall of the internal cabin.

Clause 19. The aircraft of any of Clauses 11-18, wherein the combination monument is secured to seat tracks of the internal cabin.

Clause 20. A combination monument for an internal cabin of an aircraft, the combination monument comprising:
a housing defining an internal chamber;
a lavatory within the internal chamber, wherein the lavatory comprises a toilet disposed at an angle in relation to a passage leading into the lavatory;
an attendant seat outside of the internal chamber, wherein the attendant seat is secured to a wall of the housing; and
a galley outside of the internal chamber, wherein the galley is coupled to the housing, and wherein the galley comprises:
a cart compartment is sized and shaped to retain one full size galley cart, or two half sized galley carts; and
countertop over the cart compartment.

Clause 21. A method of providing a combination monument for an internal cabin of an aircraft, the method comprising:
providing a housing defining an internal chamber;
disposing a lavatory within the internal chamber; and
coupling a galley to the housing.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A combination monument for an internal cabin of an aircraft, the combination monument comprising:
a housing defining an internal chamber;
a lavatory within the internal chamber, wherein the lavatory comprises:
a passage configured to extend between a cross-aisle of the internal cabin and the lavatory, wherein the cross-aisle leads to one or more entry doors of the aircraft; and
a toilet disposed at an angle in relation to the passage leading into the lavatory, wherein the toilet includes a toilet longitudinal plane that is at the angle in relation to a longitudinal plane that is parallel to a passage longitudinal plane of the passage, and wherein the angle is between 15-75 degrees; and
a galley coupled to the housing, wherein the galley is configured to face an aisle of the internal cabin.

2. The combination monument of claim 1, wherein the galley is outside of the internal chamber.

3. The combination monument of claim 1, wherein the galley comprises a cart compartment configured to store one or more galley carts, wherein the cart compartment is configured to face the aisle.

4. The combination monument of claim 3, wherein the cart compartment is sized and shaped to retain one full size galley cart, or two half sized galley carts.

5. The combination monument of claim 3, wherein the galley further comprises a countertop over the cart compartment.

6. The combination monument of claim 1, further comprising an attendant seat outside of the internal chamber.

7. The combination monument of claim 6, wherein the attendant seat is secured to a wall of the housing.

8. The combination monument of claim 1, wherein the combination monument is configured to be secured between the aisle, the cross-aisle, an outboard wall, and a row of seats, wherein the combination monument is configured to be spaced apart from another monument by the aisle, wherein the combination monument is configured to be secured to the outboard wall, and wherein the combination monument is configured to be secured to seat tracks of the internal cabin.

9. The combination monument of claim 1, wherein the angle is 45 degrees.

10. An aircraft comprising:
an internal cabin; and
a combination monument within the internal cabin, the combination monument comprising:
   a housing defining an internal chamber;
   a lavatory within the internal chamber, wherein the lavatory comprises:
      a passage extending between a cross-aisle of the internal cabin and the lavatory, wherein the cross-aisle leads to one or more entry doors of the aircraft; and
      a toilet disposed at an angle in relation to the passage leading into the lavatory, wherein the toilet includes a toilet longitudinal plane that is at the angle in relation to a longitudinal plane that is parallel to a passage longitudinal plane of the passage, and wherein the angle is between 15-75 degrees; and
   a galley coupled to the housing, wherein the galley faces an aisle of the internal cabin.

11. The aircraft of claim 10, wherein the galley is outside of the internal chamber.

12. The aircraft of claim 10, wherein the galley comprises:
a cart compartment configured to store one or more galley carts; and
a countertop over the cart compartment.

13. The aircraft of claim 10, wherein the combination monument further comprises an attendant seat outside of the internal chamber, and wherein the attendant seat is secured to a wall of the housing.

14. The aircraft of claim 10, wherein the combination monument is secured between the aisle, the cross-aisle, an outboard wall, and a row of seats.

15. The aircraft of claim 10, wherein the combination monument is spaced apart from another monument by the aisle.

16. The aircraft of claim 10, wherein the combination monument is secured to an outboard wall of the internal cabin.

17. The aircraft of claim 10, wherein the combination monument is secured to seat tracks of the internal cabin.

18. The aircraft of claim 10, wherein the angle is 45 degrees.

19. A combination monument for an internal cabin of an aircraft, the combination monument comprising:
a housing defining an internal chamber;
a lavatory within the internal chamber, wherein the lavatory comprises;
   a passage configured to extend between a cross-aisle of the internal cabin and the lavatory, wherein the cross-aisle leads to one or more entry doors of the aircraft; and
   a toilet disposed at an angle in relation to the passage leading into the lavatory, wherein the toilet includes a toilet longitudinal plane that is at the angle in relation to a longitudinal plane that is parallel to a passage longitudinal plane of the passage, and wherein the angle is between 15-75 degrees;
an attendant seat outside of the internal chamber, wherein the attendant seat is secured to a wall of the housing; and
a galley outside of the internal chamber, wherein the galley is coupled to the housing, wherein the galley is configured to face the aisle, and wherein the galley comprises:
   a cart compartment is sized and shaped to retain one full size galley cart, or two half sized galley carts; and
   a countertop over the cart compartment.

20. The combination monument of claim 19, wherein the angle is 45 degrees.

* * * * *